United States Patent [19]

Beardsley et al.

[11] Patent Number: 5,721,898
[45] Date of Patent: Feb. 24, 1998

[54] METHOD AND SYSTEM FOR DATA SEARCH IN A DATA PROCESSING SYSTEM

[75] Inventors: Brent Cameron Beardsley; Michael Thomas Benhase; Lawrence Carter Blount; Susan Kay Candelaria; Joseph Smith Hyde, all of Tucson, Ariz.

[73] Assignee: International Business Machines Corporation, Armonk, N.Y.

[21] Appl. No.: 939,241

[22] Filed: Sep. 2, 1992

[51] Int. Cl.$^6$ .................................................. G06F 12/02
[52] U.S. Cl. ................................................ 395/603; 395/445
[58] Field of Search ........................... 364/200 MS File, 364/900 MS File; 395/400, 425, 600, 603, 445, 440, 439

[56] References Cited

U.S. PATENT DOCUMENTS

| | | | |
|---|---|---|---|
| 3,651,483 | 3/1972 | Clark, IV et al. | 395/800 |
| 3,713,107 | 1/1973 | Barsamian | 340/172.5 |
| 4,433,392 | 2/1984 | Beaven | 395/600 |
| 4,464,718 | 8/1984 | Dixon et al. | 395/600 |
| 4,575,798 | 3/1986 | Lindstrom et al. | 364/300 |
| 4,843,541 | 6/1989 | Bean et al. | 364/200 |
| 4,967,341 | 10/1990 | Yamamoto et al. | 395/600 |
| 5,133,067 | 7/1992 | Hara et al. | 395/600 |
| 5,206,939 | 4/1993 | Yanai et al. | 395/400 |
| 5,226,165 | 7/1993 | Martin | 395/600 |
| 5,283,884 | 2/1994 | Menon et al. | 395/425 |

OTHER PUBLICATIONS

IBM Technical Disc. Bulletin vol. 32 No. 11, Apr. 1990, V.J. Legvold et al. "Record Mode Extension To Track Mode Cachingd DASD Subsystem" pp. 85-91.
Trafton, "Lookfor v. 5.0", 1990, pp. 1-4.

*Primary Examiner*—Eddie P. Chan
*Assistant Examiner*—Hiep T. Nguyen
*Attorney, Agent, or Firm*—Robert M. Sullivan; Lisa B. Yociss; Andrew J. Dillon

[57] ABSTRACT

A method and system for enhancing the efficiency of communication between one or more host computers and a storage system controller during a data search within either the associated storage systems or within the storage system controller itself. A storage system controller, coupled to one or more host computers via multiple communication channels, is utilized to control access to one or more direct access storage devices. A host computer authorizes the storage system controller to search within a range of data locations within the storage system, sets an initial location from which the data search will begin, and specifies a key field argument to search for. The host computer then permits the storage system controller to independently search the authorized range of data locations within the storage system or within cache memory within the storage system controller. The storage system controller examines multiple records within the authorized range of data locations to locate a desired record associated with the key field argument and presents a status report to the host computer only after the desired record is located or the entire range of data is searched and the desired record was not located. Allowing the storage system controller to independently search records and report status only after completion of an attempt to find a desired record within an authorized range of records minimizes communication overhead. Reducing the number of status reports presented over the communication channel enhances communication efficiency.

8 Claims, 5 Drawing Sheets

METHOD AND SYSTEM FOR DATA SEARCH IN A DATA PROCESSING SYSTEM

BACKGROUND OF THE INVENTION

1. Technical Field

The present invention relates in general to data storage systems for data processing systems, and more particularly to a system and a method for enhancing the efficiency of communication between one or more host computers and a storage system controller during a data search within either the storage system controller cache, or within one of the one or more storage systems coupled to the storage system controller.

2. Description of the Related Art

Data processing systems frequently include large scale storage devices, such as Direct Access Storage Devices (or "DASDs") located externally to the host computer and sometimes at significant distances from the host. For applications such as database storage, the data processing system may be configured with several magnetic disk units grouped together, and a storage system controller logically positioned between the group and several independent computers. Communication between the host system and such DASDs is controlled by the storage system controller which is interconnected between the plurality of host computers and the plurality of DASDs. The storage system controller handles connection and disconnection between a particular computer and a magnetic disk unit.

Communication between one or more host computers and the storage system controller, and between the storage system controller and one or more DASDs is accomplished over signal cables called channels. One type of channel has parallel copper wire paths for transmission of electrical signals. This channel type is used at distances of up to about 125 meters. Serial optical cables are used to connect computers and storage system controllers at distances of up to 15 kilometers.

Communication over the channel may be either synchronous or nonsynchronous. Synchronous operations provide efficient results, so long as the propagation times for signals on connecting lines between the host computer system and the disk drive storage system controller do not exceed a certain length. Propagation time is a function of the length of the connecting cable. Thus, the ability to provide synchronous operation between a host computer and a storage system controller has a practical upper limit based on the physical distance between the host and storage system controller. Long distance communication is more efficiently provided over serial optical cables in a nonsynchronous fashion.

Achieving synchronization between host and disk drives has been further complicated by the use of optical fiber cables connecting DASD controllers and host computers. The data burst rate over fiber optic cables is much higher than previous systems. Rate changing buffers are used to accommodate the burst rate differences between disk drives and the connection to the host computer, but such cables have introduced even longer propagation delays. Accordingly, optical fiber cables are best handled in a nonsynchronous manner.

The storage system controller handles channel connection and disconnection between a particular computer and a magnetic disk unit. The storage system controller also resolves conflicting demands of host computers for magnetic disk units. One example of a storage system controller is the "3990 Model 3 Storage Control" available from International Business Machines Corporation. Such a storage system controller executes commands which are issued by a host computer requesting service from a DASD.

The IBM 3990 Model 3 type controller can handle up to 16 channels from host computers, and up to 64 magnetic storage units. Within the storage system controller are two multipath storage directors and four storage paths, two of which are associated with each multipath storage director. Each multipath storage director may be connected to up to eight incoming channels from host computers, for a total of sixteen channels for the storage system controller as a whole. Each multipath storage director is connected to two storage paths, thus functioning as an 8×2 switch. Usually, a host computer has two or four channels, half of which are physically connected to one multipath storage director and the other half are connected to the other multipath storage director.

DASD units frequently use a count key data architecture (CKD). A record written to a DASD device may contain three areas; count, key, and data. The record always includes a count area and a data area; the key area is optional. Each area within a record is separated by a gap, and two adjacent records are separated by a gap.

I/O operations are initiated when the host computer issues a set of channel command words (CCWs), some of which might be read or write CCWs that support the CKD record format. Historically, data transfer between count-key-data type disk drive units and host computer systems has been a synchronous operation. The connection of elements providing a communication channel between disk drive and a host for the data transfer operations are timed to the rotation of the disk. The need for synchronization stems from advantages obtained in utilizing elements of the communication channel between a host computer and a disk drive for more than one function.

Each storage path is connected to all of the available magnetic disk units (DASDs). Upon indication that a disk is ready, the storage system controller can secure any one of a plurality of the channels and storage paths to establish a data path between a host and a DASD. The IBM 3990 storage system controller will allow an input/output transaction between a host computer and a magnetic disk unit to be broken into two or more separate connections, which may be handled along distinct channels and storage paths. A response to a request need not take place over the same channel from which the request was received. This feature increases throughput through the storage system controller. While each storage path is, in effect, a stand alone control unit based upon its own microprocessor, the storage paths share control arrays in a common memory space for synchronization functions relating to handling connections, disconnections and reconnections relating to a transaction. Establishing connections, then disconnecting and reconnecting channels to a host computer consumes time and resources that could be used by other host computers.

In known storage systems, a storage system controller reported status to the host computer after each key field was examined, as a desired data record was sought. Those skilled in the art will appreciate that in a nonsynchronous serial communication link the overhead associated with this continual status update imposes a significant burden on scarce communication resources. Data transferred over a serial data link contains additional overhead information in data packet headers. For example, such data headers may contain a description of the data or a description of where the data is to be sent. Such status reports may cause other host computers in the system to delay processing while waiting for a free channel to access data stored in a storage system. Thus, it should be obvious that a need exists for a system and a method for reducing the amount of status information communicated between a storage system controller and a host computer and thereby increasing the efficiency of the data processing system as a whole.

SUMMARY OF THE INVENTION

It is therefore one object of the present invention to provide an improved data processing system.

It is another object of the present invention to enhance the efficiency of data communication between a host computer system and a storage system controller.

It is yet another object of the present invention to provide a system and a method for reducing the amount of status information communicated between a storage system controller and a host computer during a data search thereby increasing the efficiency of the data processing system.

The foregoing objects are achieved as is now described. A method and system are disclosed for enhancing the efficiency of communication between one or more host computers and a storage system controller during a data search within either the associated storage systems or within the storage system controller itself. A storage system controller, coupled to one or more host computers via multiple communication channels, is utilized to control access to one or more direct access storage devices. A host computer authorizes the storage system controller to search within a range of data locations within the storage system, sets an initial location from which the data search will begin, and specifies a key field argument to search for. The host computer then permits the storage system controller to independently search the authorized range of data locations within the storage system or within cache memory within the storage system controller. The storage system controller examines multiple records within the authorized range of data locations to locate a desired record associated with the key field argument and presents a status report to the host computer only after the desired record is located or the entire range of data is searched and the desired record was not located. Allowing the storage system controller to independently search records and report status only after completion of an attempt to find a desired record within an authorized range of records minimizes communication overhead. Reducing the number of status reports presented over the communication channel enhances communication efficiency.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
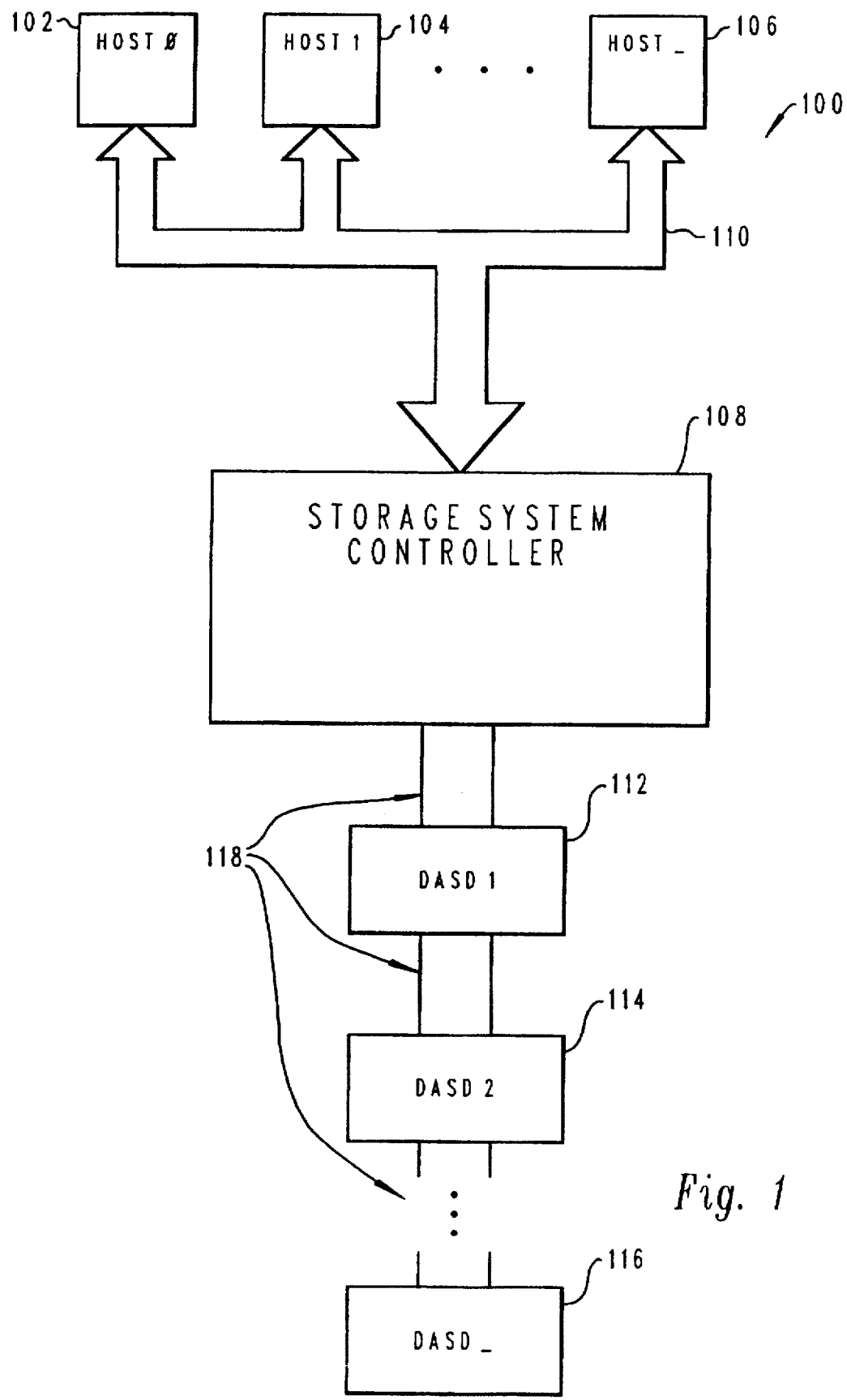
FIG. 1 depicts a high level block diagram of a data processing system which may be utilized to implement the method and system of the present invention.

With reference now to the figures and in particular with reference to FIG. 1, there is depicted a high level block diagram of a data processing system 100. Data processing system 100 includes a plurality of host computers 102, 104 and 106. Host computers 102–106 are typically main frame systems such as the IBM 3090 or ES9000 Model computers or comparable systems. Host computers 102–106 are connected to a storage system controller 108 by data channels 110. Data channels 110 are either parallel data channels or serial data channels. Optical serial channels may be utilized for data transmission over distances up to 15 kilometers. Parallel channels utilize electrical signals and are generally not used at distances of greater than about 125 meters. Storage system controller 108 is connected to up to 64 direct access storage devices 112, 114 and 116. Storage system controller 108 provides a common interconnection 118 between storage system controller 108 and each direct access storage device 112–116.

Figure 2:
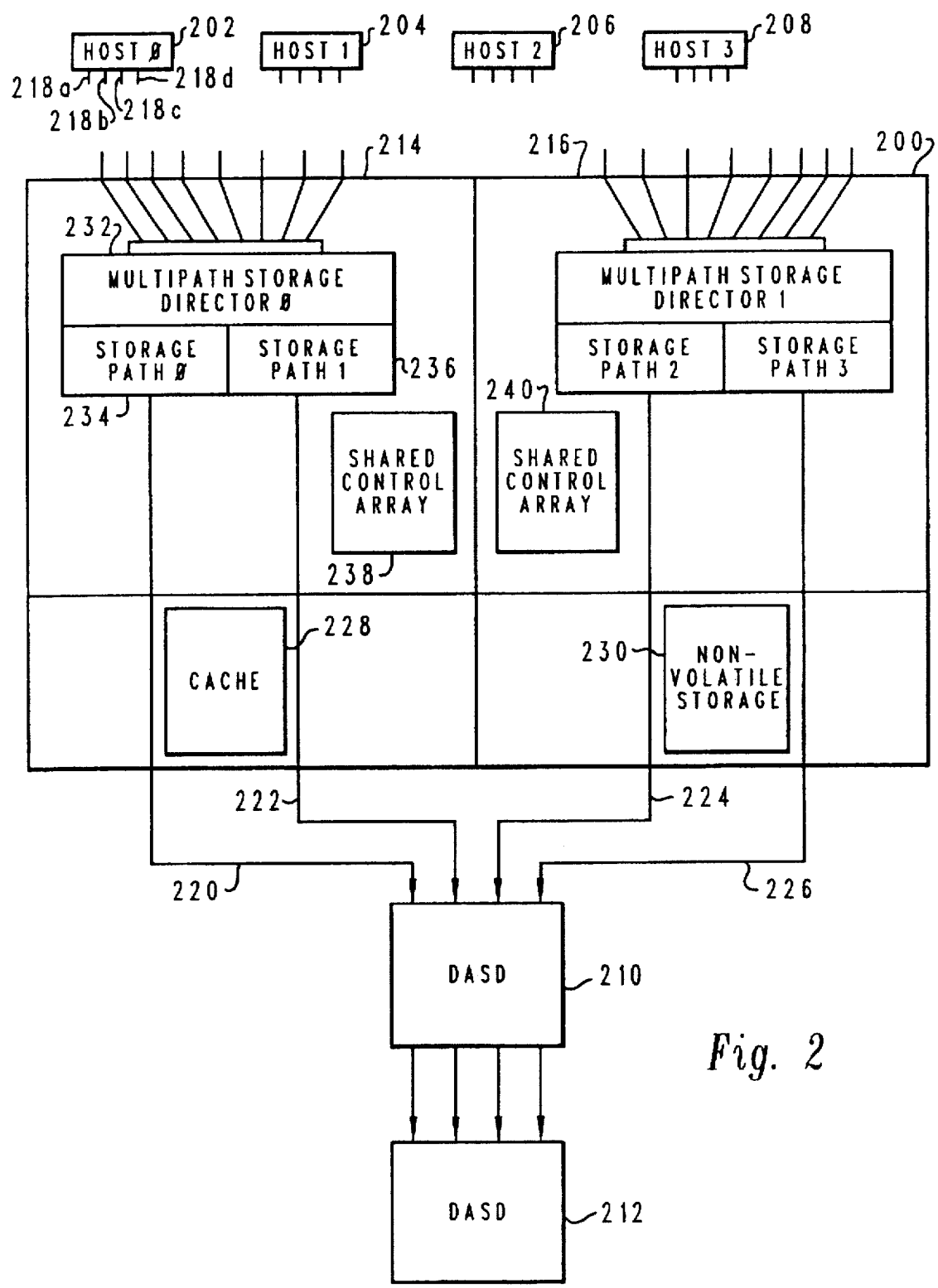
FIG. 2 is a block diagram further illustrating the details of a storage system controller of the data processing system depicted in FIG. 1.

FIG. 2 illustrates storage system controller 200 connected to a plurality of host computers 202, 204, 206 and 208, and to direct access storage devices 210 and 212. Storage system controller 200 is preferably an IBM 3990 Model 3 type controller, which is available from International Business Machines Corporation. Storage system controller 200 has two storage clusters 214 and 216, each of which provides for selective connection between host computer systems 202–208 and direct access storage devices 210 and 212. Although four host computer systems and two direct access storage devices are depicted, storage system controller 200 can handle both additional computer systems and direct access storage devices. Data from a given host computer system, for example host computer system 202, may be stored to, or recovered from any of the direct access storage devices 210 and 212. Host computer 202 is connected by at least two, and by up to four cables 218a–d, to storage system controller 200. Where two cable connections are provided, one is connected to storage cluster 214 and the second to storage cluster 216. Where four cable connections are provided, two each are connected to storage clusters 214 and 216. Remaining host computers 204–208 similarly have a plurality of connections to controller 200. In accordance with the 370-XA architecture, storage system controller 200 may receive a request from host computer 202 over one cable, e.g. 218b, and respond to it over any one of cables 218a–d.

Notwithstanding connection to up to 16 channels, storage system controller 200 provides just four paths 220, 222, 224 and 226 out to direct access storage devices 210 and 212. Only one of the paths 220 through 226 has access to a direct access storage device at a time.

Storage system controller 200 is internally divided into four sections corresponding to independent power supplies.

Two sections are storage clusters 214 and 216, respectively. A third section includes a memory cache 228. A fourth section includes a nonvolatile storage 230. Memory cache 228 provides storage for frequently accessed data. Nonvolatile storage 230 is used for temporary storage of data being written to a storage device when synchronization of connections between storage device and the writing host is not possible. Storage of data in nonvolatile storage under such circumstances is required to allow indication to a host that the storage operation is logically complete, notwithstanding the fact that actual transfer of the data to a direct access storage device has not yet been completed.

Storage clusters 214 and 216 mirror one another in terms of functional features (although not in operations), and thus only storage cluster 214 is described here. Storage cluster 214 includes a multipath storage 232 which operates as a 4×2, or 8×2 switch between the cables (channels) from host computer systems 202–208 into storage cluster 214, and storage paths 234 and 236. Storage paths 234 and 236 are connected to direct access storage devices 210 and 212 along paths 220 and 222, respectively. Storage cluster 214 also includes a shared control array (SCA) 238, which duplicates the contents of shared controlled array 240 in storage cluster 216. Shared control arrays 238 and 240 store path and group information as well as control blocks for direct access storage devices 210 and 212.

Figure 3:
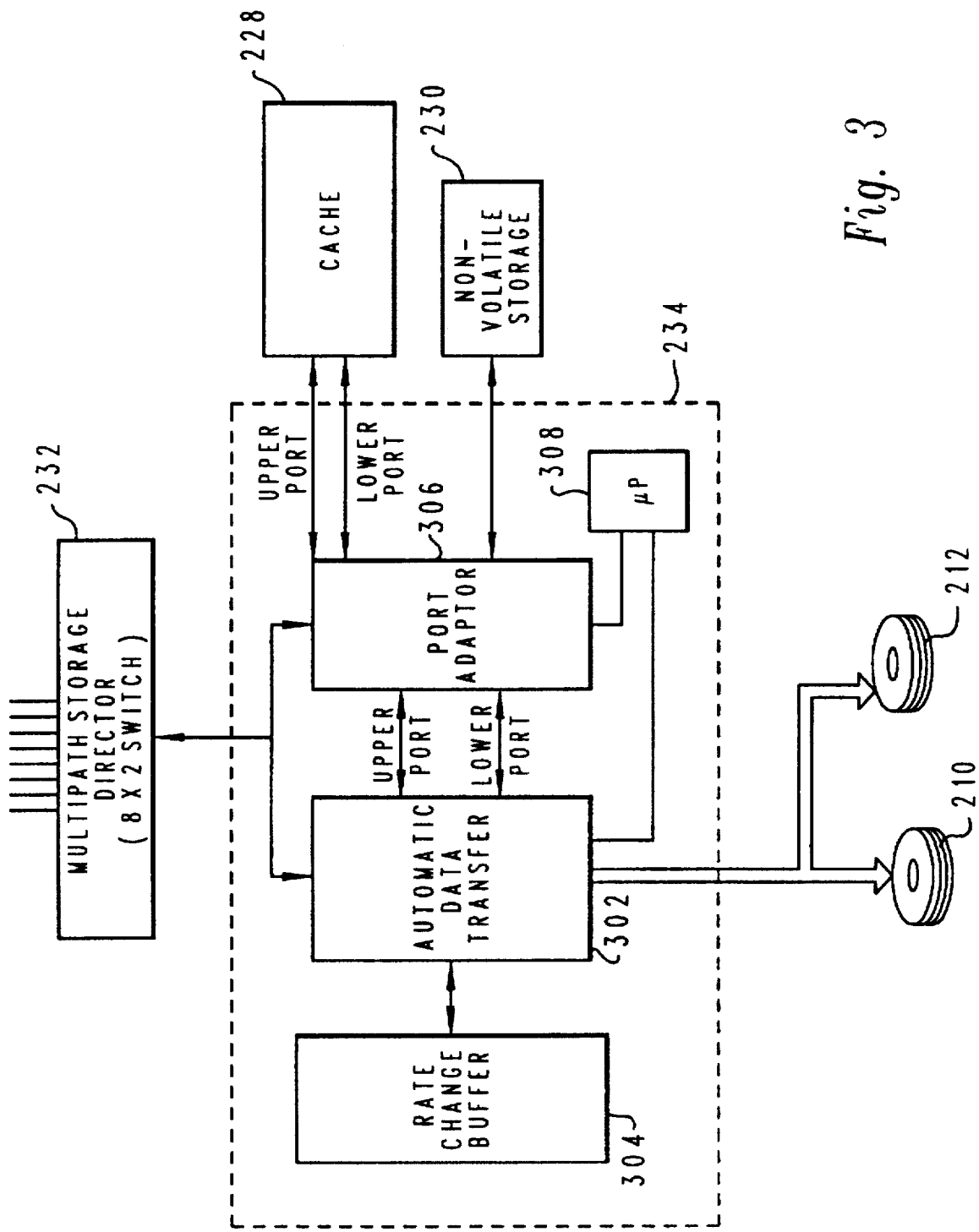
FIG. 3 is a block diagram further illustrating the details of a storage path within the storage system controller of FIG. 2.

FIG. 3 depicts storage path 234 in a block diagram schematic, as an example of any one of storage paths 234, 236 or the storage paths depicted in storage cluster 216. Storage path 234 is connected out to multipath storage director 232 by an upper port and to a plurality of direct access storage devices 210 and 212 by a lower port. Data transfer between multipath storage director 232 and direct access storage device 210 or 212 during synchronous operations occurs via automatic data transfer circuit 302 supported by rate change buffer 304, if required. While two direct access storage devices are shown, as many as sixty-four such devices may be attached to storage system controller 200. Rate change buffer 304 compensates for differences between the speed of data transference by disk drive type direct access storage devices 210 and 212 and the operating speed of the physical links to host computers, which are typically faster.

A port adaptor 306 is used to control transfer of data into and out of cache 228 and nonvolatile storage 230. As discussed above, the presence of cache 228 and nonvolatile storage 230 provide for logical completion of certain data transfers, from the perspective of host computers 202–208, without waiting for physical synchronization of storage units 210 and 212. All operations of storage path 234 are under control of a micro computer 308.

Before data transfer can begin, the storage device control must be oriented. Orientation is accomplished by detecting either an index point or a start-of-count area other than record zero. Once the count area, or index, has been detected, the device control can work its way down the track to perform the operations commanded by the channel.

After validating the locate record parameters, the control unit directs the storage device, or cache, to seek to a first-specified track, positions the stage device, or cache, to the designated sector, and begins a search operation to further position itself to a particular area on the track.

Figure 4:
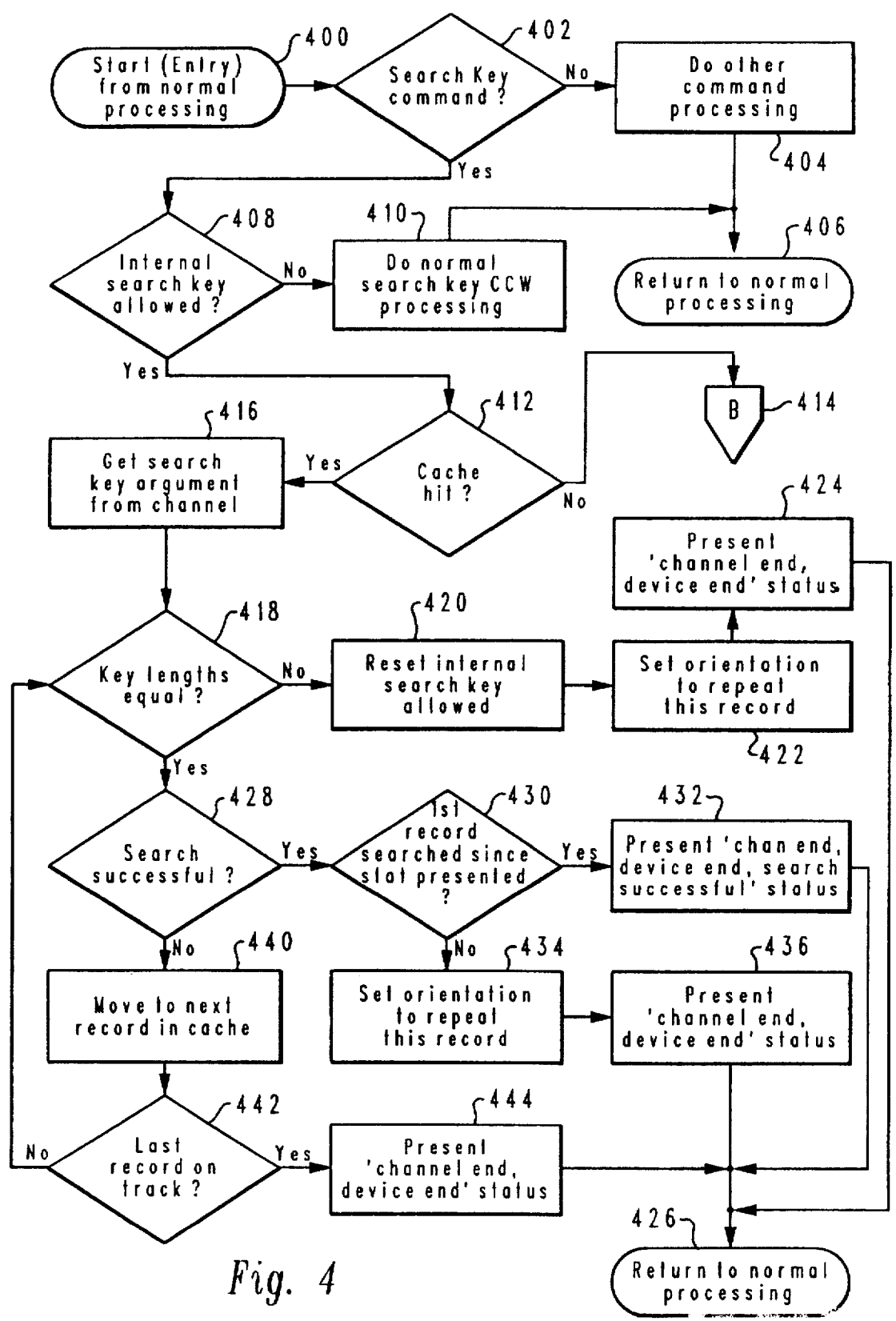
FIG. 4 is a logical flowchart illustrating a programmed response of the storage system controller to a search request by host computer wherein the data searched for is contained within cache memory.

FIG. 4 illustrates a logical flowchart for a process for implementing the system and method of the invention, executable on microcomputer 308 of FIG. 3. Terminal block 400 represents the entry point from normal processing. As illustrated at decision block 402, the processor determines whether the host has requested the execution of a search key command. If not, signal processor 234 executes other command processing as depicted in process block 404. After other command processing is complete, the processor returns to normal processing as illustrated at terminal block 406.

If a search key command is received, processing continues along the "yes" branch from decision block 402 to decision block 408. Block 408 illustrates determinations of whether or not an internal search key is allowed. If an internal search is not allowed, normal search key channel command word processing proceeds as depicted at block 410, and when completed, control returns to normal processing as illustrated at terminal block 406.

If an internal search key is allowed, the process continues to decision block 412 which illustrates a determination of whether or not the data requested is contained within cache memory or whether a disk access is required to retrieve the desired data. If a disk access is required the process continues along the "no" branch from decision block 412 to connector block B 414, which transfers control to a section of the logical flowchart contained in FIG. 8, which is discussed below. If the desired data is stored in cache memory, the process continues along the "yes" branch to process block 416 which depicts the receipt of a "search key argument" via the channel from the host computer. Decision block 418 illustrates a comparison of the lengths of the search key argument from the channel and the key of the first record to be searched. If the key lengths are not equal, the process continues to block 420 which depicts the resetting of the flag that allows internal search key operation. Next, block 422 illustrates setting the disk controller orientation to repeat this record. Thereafter, as depicted in block 424, the disk controller sends a "channel end, device end" status to the host, which indicates that the command is complete and the host may send the next command. After sending the status message as illustrated in block 424, control returns to normal processing as depicted by terminal block 426.

Continuing from the "yes" branch of decision block 418, decision block 428 illustrates a determination of whether or not the search was successful. If the search was successful, and this was the first record searched since status was presented, as illustrated by decision block 430, control passes to block 432 which depicts the disk controller presenting a "channel end, device end, search successful" status message to the host computer. Then the process then returns to normal processing, as illustrated at terminal block 426.

If, as depicted at decision block 428, the determination is made that the search was not successful, the disk controller moves to the next record in cache, as illustrated in process block 440. As depicted at decision block 442, the process then determines whether or not the record just examined is the last record on the track. If not, process control passes through the "no" branch from decision block 442 to decision block 418, which illustrates a comparison of the key lengths once again. If this is the last record on the track, process block 444 depicts the disk controller presenting a "channel end, device end" status message to the host and control returns to normal processing as illustrated at terminal block 426. If it is determined at decision block 430 that this is not the first record searched, orientation is set to repeat this record, as depicted at process block 434. Next, block 436 illustrates the transmission of a "channel end, device end" status message to the host computer and control is returned to normal processing as depicted at terminal block 426. As a result, when the host computer repeats this record, count information may be requested by the host computer in order that the host will know from where the data was read on the disk.

Figure 5:
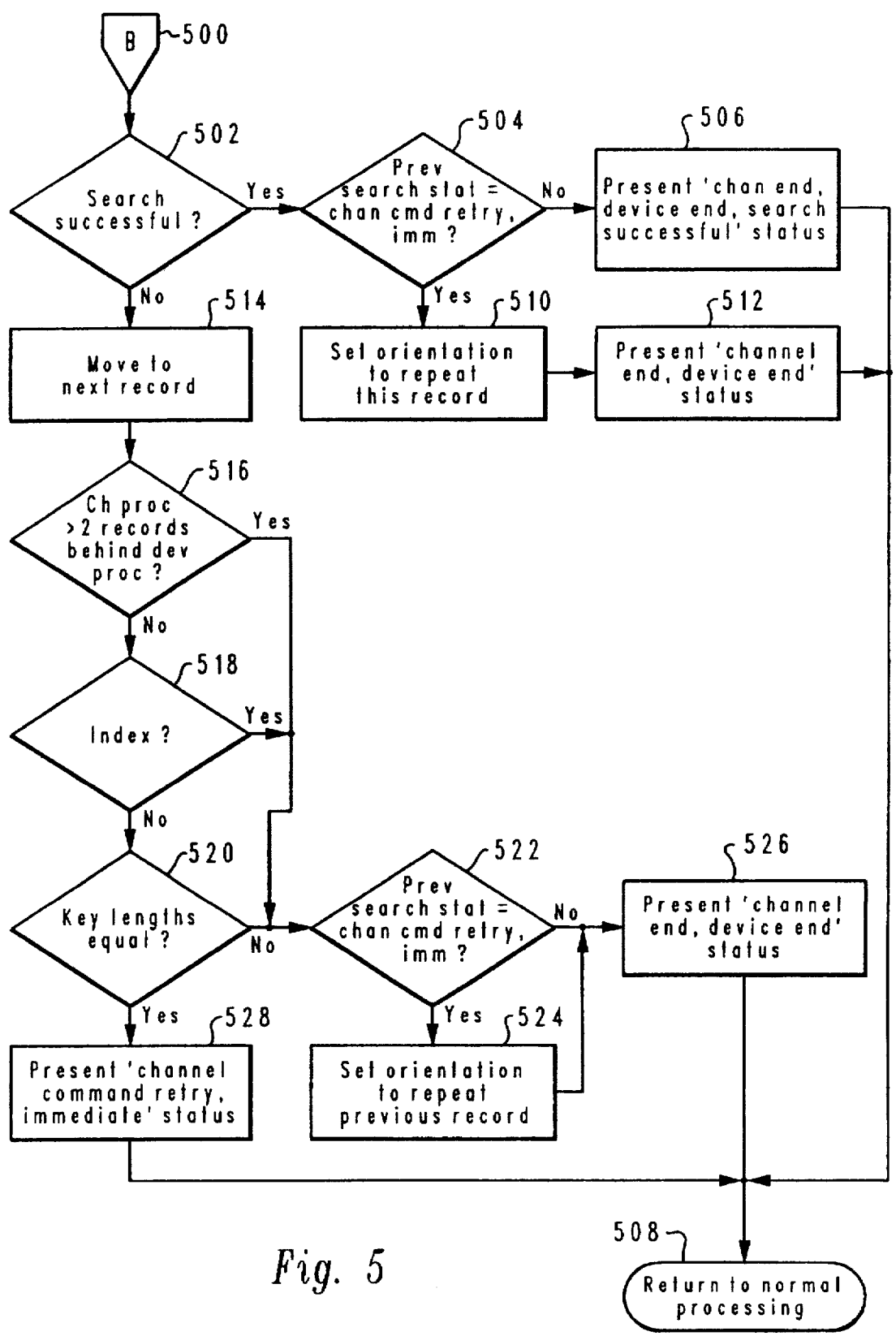
FIG. 5 is a logical flowchart illustrating a programmed response of the storage system controller to a search request by a host computer wherein the data searched for is contained within a DASD.

Finally, with reference to FIG. 5, there is depicted a programmed response of the storage system controller to a search request by a host computer wherein the data searched for is contained within a DASD. Connector block 500 is coupled to connector block 414 in FIG. 4. This portion of the process occurs as a result of a determination by the processor that the data record requested by the host is not contained within cache memory, and therefore the processor must access the direct access storage devices. As illustrated at decision block 502, a determination is made as to whether or not the key search was successful. If the search was successful, the process determines whether or not the previous search status was a "channel command retry, immediate" as depicted at decision block 504. If not, the process then presents "channel end, device end, search successful" status message to the host computer as depicted at block 506. Then, processing returns to normal as illustrated at terminal block 508. If the previous search status message was "channel command retry, immediate" then processing continues, as depicted at process block 510, which illustrates the setting of the orientation to repeat this record and then, as depicted at process block 512, the processor presents a "channel end, device end" status message to the host computer. Then, processing returns to normal, as depicted at terminal block 508. As a result, when the host computer repeats this record, count information may be requested by the host computer in order that the host will know from where the data was read on the disk.

Next, as illustrated at decision block 502, if the processor determines that the search was unsuccessful, control moves to process block 514 which depicts the process moving on to read the next record. As illustrated at decision block 516, the process then determines whether or not the channel process is less than two records behind the device process. If not, then the process determines whether or not the track index has been reached, as depicted at decision block 518. If not, the process compares the lengths of the key argument from the host processor and the key field associated with the currently addressed record, as illustrated at block 520. If the key lengths are equal, the process presents a "channel command retry, immediate" status message as depicted at block 528 and returns to normal processing, as depicted at terminal block 508.

If the channel process is less than two records behind the device process, as determined at block 516, or a track index has been reached, as depicted at block 518, or the key lengths are not equal, as illustrated in block 520, the process continues, as depicted in decision block 522. If any of the aforementioned conditions exist, the process determines whether or not the previous search status message sent to the host was "channel command retry, immediate." If so, the process sets the orientation to repeat the previous record, as depicted at block 524. Next, the process continues as shown in block 526, which illustrates the transmission of a "channel end, device end" status message to the host computer and the process then returns to normal processing, as shown at terminal block 508. If, as depicted at decision block 522, the previous status message was not "channel command retry, immediate," then the processor presents a "channel end, device end" status message as illustrated at process block 526 and then returns to normal processing, as shown in terminal block 508.

While the invention has been particularly shown and described with reference to a preferred embodiment, it will be understood by those skilled in the art that various changes in form and detail may be made therein without departing from the spirit and scope of the invention.

What is claimed is:

1. A method for enhancing the efficiency of communication between one or more host computers and a storage system controller during a data search within one or more storage systems associated with said storage system controller, the method comprising the steps of:

authorizing a data search by transmitting a range of data locations from one of said host computers to said storage system controller, wherein said range of data locations includes locations of multiple records within said one or more storage systems;

setting an initial location from which said data search will begin;

specifying a key field argument;

permitting said storage system controller to search said range of data locations within said one or more storage systems;

examining key fields in multiple records within said range of data locations within said storage system to locate a record associated with said key field argument; and transmitting a report from said storage system controller to said one of said host computers only in response to a location of a record within said range of data locations or a failure to locate said record associated with said key field argument, wherein communication between said one or more host computers and said storage system controller is minimized.

2. The method for enhancing the efficiency of communication between one or more host computers and a storage system controller according to claim 1 wherein said storage system controller includes a cache memory area containing stored records, further comprising the steps of:

determining whether said stored records stored in said cache memory storage area within said storage system controller are within said authorized range of data locations;

examining multiple records stored within said cache memory storage area to locate a record associated with said key field argument; and transmitting a report from said storage system controller to said host computer only in response to allocation of a record within said range of data locations within said cache memory storage area, wherein communication between one or more host computers and said storage system controller is minimized.

3. The method for enhancing the efficiency of communication between one or more host computers and a storage system controller according to claim 2 wherein said storage system controller includes a cache memory area containing stored records, and wherein the step of examining key fields in multiple records within said range of data locations further comprises the steps of:

examining key fields in multiple records within said range of data locations within said one or more storage systems to locate a record associated with said key field argument in response to a failure to find a record associated with said key field argument located in said cache memory area within said storage system controller; and transmitting a report from said storage system controller to said one of said host computers in response to a location of a record associated with said key field argument within said range of data locations, or a failure to locate said record associated with said key field argument, wherein communication between said one or more host computers and said storage system controller is minimized.

4. A method for enhancing the efficiency of communication between one or more host computers and a storage system controller according to claim 3 wherein the step of examining key fields in multiple records further comprises the step of:

comparing the length of said key field argument with the length of a current key field arguments for each of said multiple records within said authorized range of data locations within said storage system.

5. A system for enhancing the efficiency of communication between one or more host computers and a storage system controller during a data search within one or more storage systems associated with said storage system controller, said system comprising:

control means for authorizing a data search by transmitting a range of data locations from one of said host computers to said storage system controller, wherein said range of data locations includes locations of multiple records within said storage system, and for setting an initial location from which said data search will begin, and for specifying a key field argument;

a storage system controller for searching said range of data locations within said storage system;

examination means within said storage system controller for examining key fields in multiple records within said range of data locations within said storage system to locate a record associated with said key field argument; and means for transmitting a report from said storage system controller to said one of said host computers only in response to a location of a record within said range of data locations or a failure to locate said record associated with said key field argument, wherein communication between said one or more host computers and said storage system controller is minimized.

6. The system for enhancing the efficiency of communication between one or more host computers and a storage system controller according to claim 5 wherein said storage system controller includes a cache memory area therein, and wherein said examining means includes means for examining key fields in multiple records within said cache memory area.

7. The system for enhancing the efficiency of communication between one or more host computers and a storage system controller according to claim 5 wherein said means for transmitting a report from said storage system controller to said one of said host computers includes a serial communications link between said storage system controller and said one or more host computers.

8. The system for enhancing the efficiency of communication between one or more host computers and a storage system controller according to claim 7 wherein said serial communications link between said storage system controller and said one or more host computers is an optical serial communications link.

* * * * *

UNITED STATES PATENT AND TRADEMARK OFFICE
CERTIFICATE OF CORRECTION

PATENT NO.    :   5,721,898
DATED         :   February 24, 1998
INVENTOR(S)   :   Beardsley et al.

It is certified that error appears in the above-identified patent and that said Letters Patent is hereby corrected as shown below:

Column 5, line 60:  change "stage" to --storage--

Signed and Sealed this

Twenty-eighth Day of July, 1998

Attest:

BRUCE LEHMAN

Attesting Officer     Commissioner of Patents and Trademarks